(No Model.) 2 Sheets—Sheet 2.
G. S. HUNGERFORD.
MACHINE FOR SEPARATING COFFEE, &c.
No. 345,633. Patented July 13, 1886.
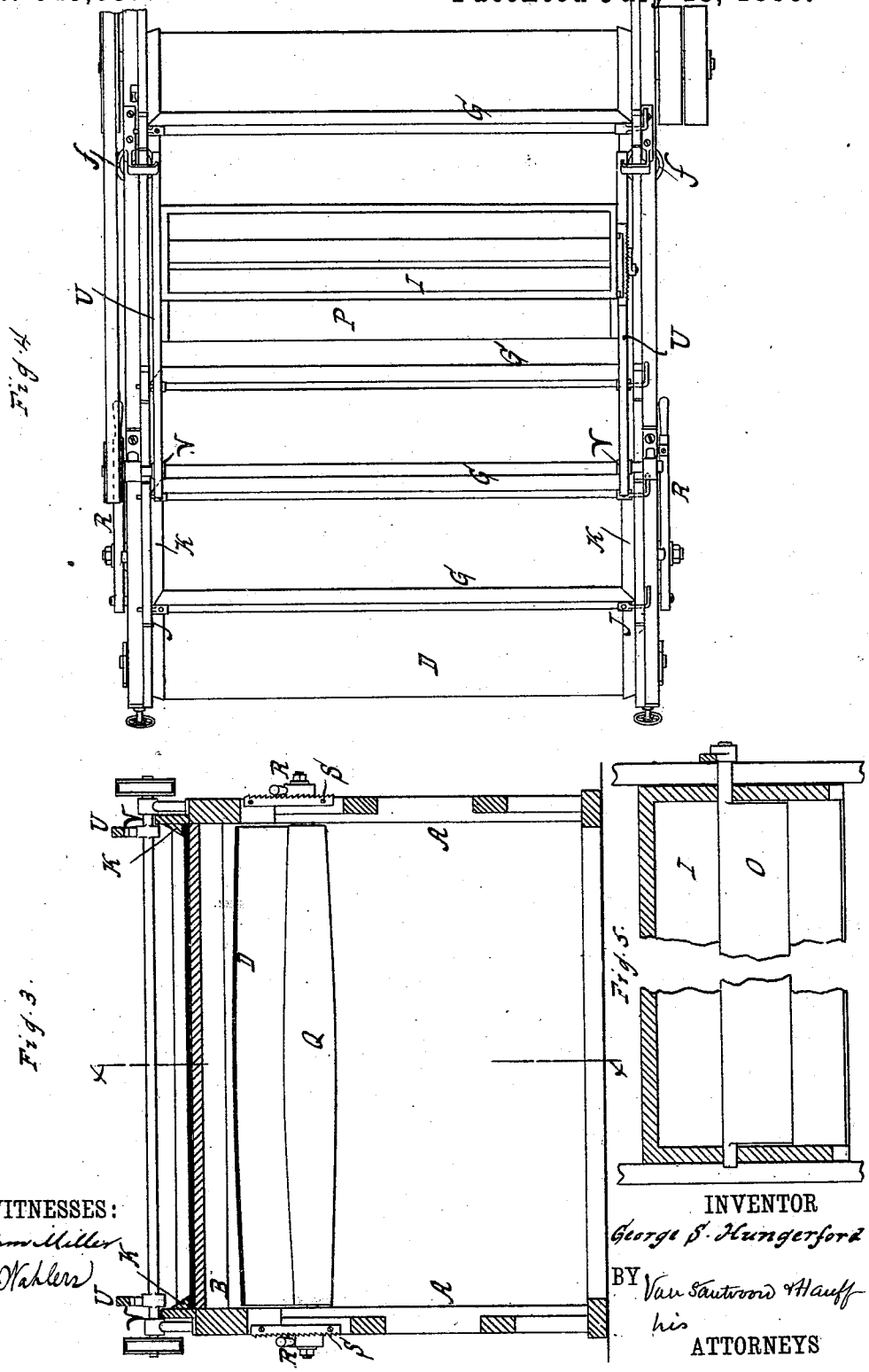
WITNESSES:
William Miller
Chas. Nahlers
INVENTOR
George S. Hungerford
BY Van Santvoord & Hauff
his ATTORNEYS
N. PETERS, Photo-Lithographer, Washington, D. C.

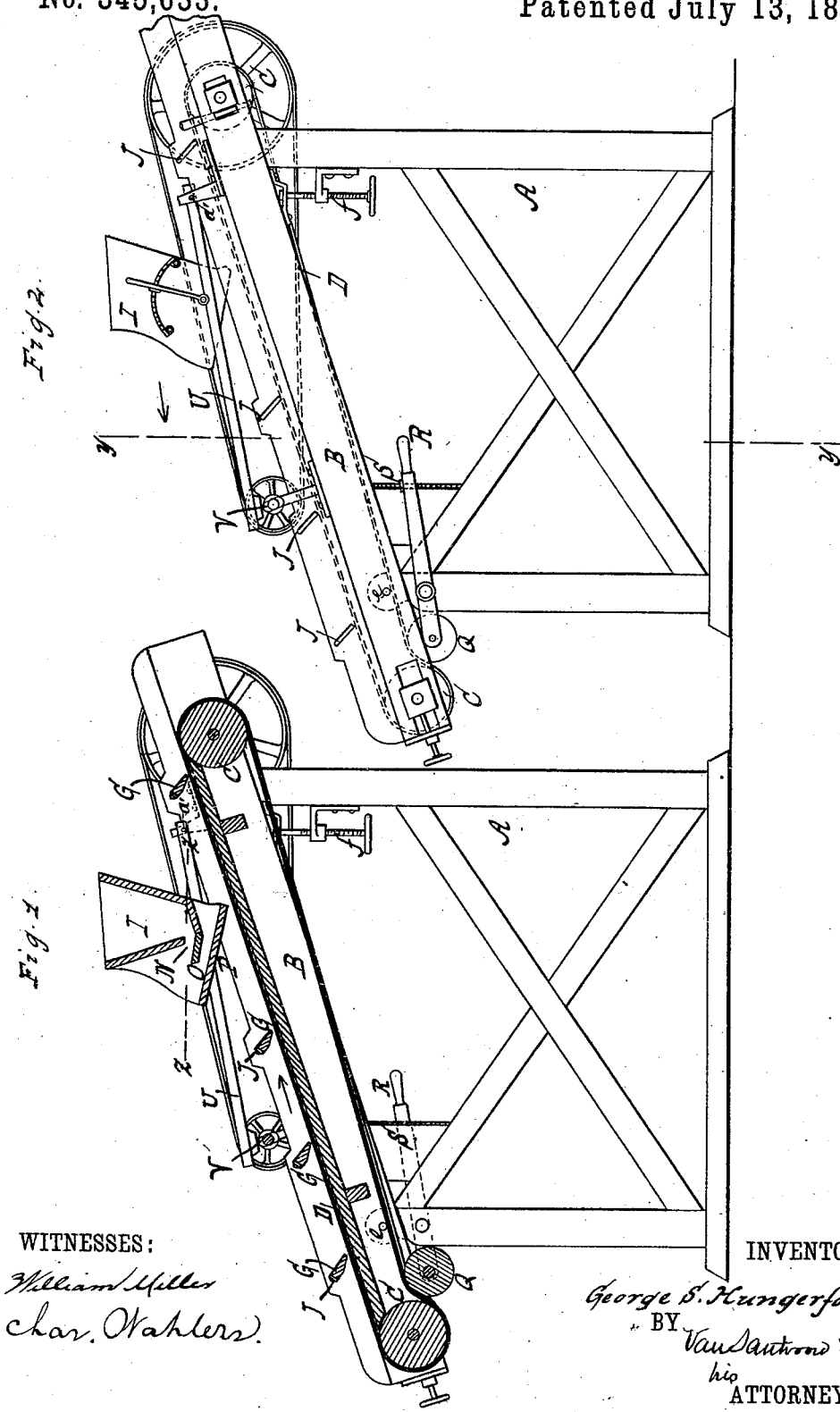

UNITED STATES PATENT OFFICE.

GEORGE S. HUNGERFORD, OF NEW YORK, N. Y.

MACHINE FOR SEPARATING COFFEE, &c.

SPECIFICATION forming part of Letters Patent No. 345,633, dated July 13, 1886.

Application filed June 26, 1884. Renewed June 4, 1886. Serial No. 204,178. (No model.)

*To all whom it may concern:*

Be it known that I, GEORGE S. HUNGERFORD, a citizen of the United States, residing at New York, in the county and State of New York, have invented new and useful Improvements in Machines for Separating Coffee and other Grains, of which the following is a specification.

My invention relates to machines for separating coffee or other grains and seeds in which flat and round kernels or beans are mixed together. Nearly all coffee as it comes from the producer contains a quantity of round beans, called "pea-grains" or "mocha," which command a higher price than the flat grains of the same lot of coffee, and it is therefore important to separate these round beans or grains from the rest.

The object of my invention is to produce a superior machine for separating the round grains from the flat grains at one operation; and to this end I employ an endless apron or carrier, which is arranged on an inclined plane, so that the round grains will roll down over the apron and be discharged at the foot thereof, while the flat grains will be carried up by the apron and be discharged at the head thereof.

The peculiar and novel construction of my separating-machine is pointed out in the following specification and claims, and illustrated in the accompanying drawings, in which—

Figure 1 represents a longitudinal vertical section in the plane *x x*, Fig. 3. Fig. 2 is a side elevation. Fig. 3 is a transverse section in the plane *y y*, Fig. 2. Fig. 4 is a plan or top view. Fig. 5 is a horizontal section of the hopper on a larger scale than the previous figures, the plane of section being indicated by the plane *z z*, Fig. 1.

Similar letters indicate corresponding parts.

In the drawings, the letter A designates the stationary main frame, and B a movable frame supporting the rollers C C of the inclined endless apron D, the shaft of one of these rollers being provided with a pulley or other means for imparting to the roller a revolving motion, thereby causing the apron to travel in an upward direction, as indicated in Fig. 1. The movable frame B is pivoted at one end to the main frame, as at *e*, and is connected thereto at the opposite end by set-screws *f*, whereby the frame B, together with the endless apron, may be adjusted to any desired inclination.

G indicates a series of reversing-blades, which are arranged above the upper portion of the endless apron D, in a direction transversely thereto, so that the coffee deposited on the apron is exposed to the action of these blades.

I denotes a hopper from which the coffee is fed to the apron. This hopper is intermediate of the two upper blades, G, and by the action of the blades which are below that point any flat beans that may take an upright position on the apron are turned over, so as to travel with the apron in its upward course, while by the blade which is above the point named any round beans that may take a position lengthwise to the apron are turned to a position transversely thereof, and thus made to roll down on the apron in the proper manner.

It is important to provide simple and efficient means for adjusting the edges of the reversing-blades to and from the surface of the apron D, and holding them in the position to which they are adjusted, for the purpose of adapting the blades to coffees of different grades. This I accomplish by journaling the ends of each blade in bearings in the sides of the movable frame B, so that each blade can be swung in the arc of a circle to move its edge to and from the surface of the apron.

It is essential to provide some means for holding the blades in position after being turned to the desired adjustment, and this I effect by making the journals of the blades in the form of friction-pins J, which by frictional contact with their bearings in the frame B will retain the blades in their adjusted position.

The apron-frame B is provided on the opposite sides with longitudinal strips K, which overlap the edges of the apron, and are inclined in the direction thereof to act as guards or deflectors for preventing the escape of coffee over the edges of the apron; and in order to adapt the reversing-blades G to these deflectors they are inclined at the opposite ends to correspond therewith, as indicated in Fig. 4.

The hopper I is provided with a lateral discharge-orifice, N, to the lower edge of which is hung a swinging adjustable gate, O, and it is also provided at a point below the discharge-orifice with an inclined delivery-board, P, which extends in an opposite direction to the apron, so that the material issuing from the discharge-orifice is received on the delivery-board, and thereby conducted to the apron, while by adjusting the swinging gate the discharge of material can be regulated with nicety.

The hopper I is supported by bars U, pivoted at one end, a', to the apron-frame B, and at their other and free ends acted on by cams V, whereby the bars are vibrated to shake the hopper.

In superficial contact with the apron D is arranged a roller, Q, which is of convex shape in the direction of its length, and is mounted on levers R, engaging with racks S, so that this roller may be adjusted in relation to the apron, and thus act as a tightener, while by the shape of the roller it is adapted to guide the apron in a right line.

It is evident that other means than the levers and racks may be used for adjusting the combined tightening and guide roller.

In separating grains—such as mustard-seed—containing dust and other matter liable to adhere to the apron one or more brushes may be arranged to act on the apron for removing such matters.

What I claim as new, and desire to secure by Letters Patent, is—

1. The combination, with the inclined apron and the frame, of the reversing-blades having friction-pins at their ends arranged in bearings in the frame for swinging the blades and holding them in any position to which adjusted relatively to the apron, substantially as described.

2. The combination, with the frame, the inclined deflectors attached to the sides thereof, and the inclined endless apron traveling beneath the deflectors, of the reversing-blades arranged to swing in arcs of circles to adjust their edges to and from the apron, and having inclined ends conforming to the inclined deflectors, and means for holding the blades in any position to which they may be adjusted, substantially as described.

3. The combination, with the frame, the inclined deflectors, and the inclined endless apron, of the reversing-blades having inclined ends conforming to the inclined deflectors, and provided with friction-pins arranged in bearings in the frame, for swinging the blades and holding them in any position to which adjusted relatively to the apron, substantially as described.

4. The combination, with the inclined endless apron, the apron-frame, and the inclined deflectors, of a series of reversing-blades having inclined ends conforming to the inclined deflectors, and each blade adjustable to and from the apron independent of the other blade or blades, substantially as described.

5. The combination of the movable frame, the inclined endless apron, and transverse reversing-blades with the hopper having the lateral discharge-orifice N, the delivery-board P, arranged below the orifice and inclined in a direction opposite to the inclination of the apron, and the gate O, adjustable in the lateral discharge-orifice to and from the delivery-board, the side bars pivoted on the movable frame and supporting the hopper, and mechanism for vibrating the side bars to shake the hopper, substantially as described.

In testimony whereof I have hereunto set my hand and seal in the presence of two subscribing witnesses.

GEORGE S. HUNGERFORD. [L. S.]

Witnesses:
W. HAUFF,
WILLIAM MILLER.